(12) United States Patent
Williams

(10) Patent No.: US 10,549,701 B2
(45) Date of Patent: Feb. 4, 2020

(54) CARGO CARRIER WITH CHASSIS ATTACHMENT SYSTEM

(71) Applicant: Marty Williams, Colorado Springs, CO (US)

(72) Inventor: Marty Williams, Colorado Springs, CO (US)

( * ) Notice: Subject to any disclaimer, the term of this patent is extended or adjusted under 35 U.S.C. 154(b) by 329 days.

(21) Appl. No.: 15/394,691

(22) Filed: Dec. 29, 2016

(65) Prior Publication Data
US 2017/0182947 A1    Jun. 29, 2017

Related U.S. Application Data

(60) Provisional application No. 62/272,610, filed on Dec. 29, 2015.

(51) Int. Cl.
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC .. B60R 9/06; B60R 9/065; B60R 9/10; B60R 11/06
USPC ....... 224/519, 497, 498, 499, 511, 512, 516, 224/517, 518, 524–527
See application file for complete search history.

(56) References Cited

U.S. PATENT DOCUMENTS

| 3,727,785 | A | * | 4/1973 | Lutz | B65D 9/12 217/12 R |
|---|---|---|---|---|---|
| 3,966,285 | A | * | 6/1976 | Porch | B65D 7/24 312/265.4 |
| 2005/0092799 | A1 | * | 5/2005 | Morris | B60R 9/06 224/484 |
| 2007/0051720 | A1 | * | 3/2007 | Chen | B65D 11/1846 220/6 |
| 2008/0238141 | A1 | * | 10/2008 | Aghajanian | B60R 9/06 296/186.4 |
| 2009/0180853 | A1 | * | 7/2009 | Gang | B60R 9/06 414/462 |
| 2010/0127027 | A1 | * | 5/2010 | Williams | B60R 9/00 224/401 |
| 2015/0059623 | A1 | * | 3/2015 | Brown | B60R 9/06 108/42 |
| 2016/0214451 | A1 | * | 7/2016 | Harrison | B60D 1/58 |
| 2017/0341591 | A1 | * | 11/2017 | Moore | B60P 1/00 |
| 2018/0086277 | A1 | * | 3/2018 | Wilson | B60R 5/045 |

* cited by examiner

*Primary Examiner* — Corey N Skurdal
(74) *Attorney, Agent, or Firm* — Tracy M. Heims; Apex Juris, pllc.

(57) ABSTRACT

A configurable, easily assembled and disassembled cargo carrier having at least one floor member with at least one downward facing flanged edge, at least two side members where each side member has an outward facing flanged top edge and an inward facing flanged bottom edge, at least one corner brace to securely connect one of the side members to another of the side members, thereby forming a corner of the cargo carrier, fasteners for securing the floor member to the side members and the corner braces to the side members, and a chassis attachment system for securing assembled cargo carrier to a chassis.

9 Claims, 20 Drawing Sheets

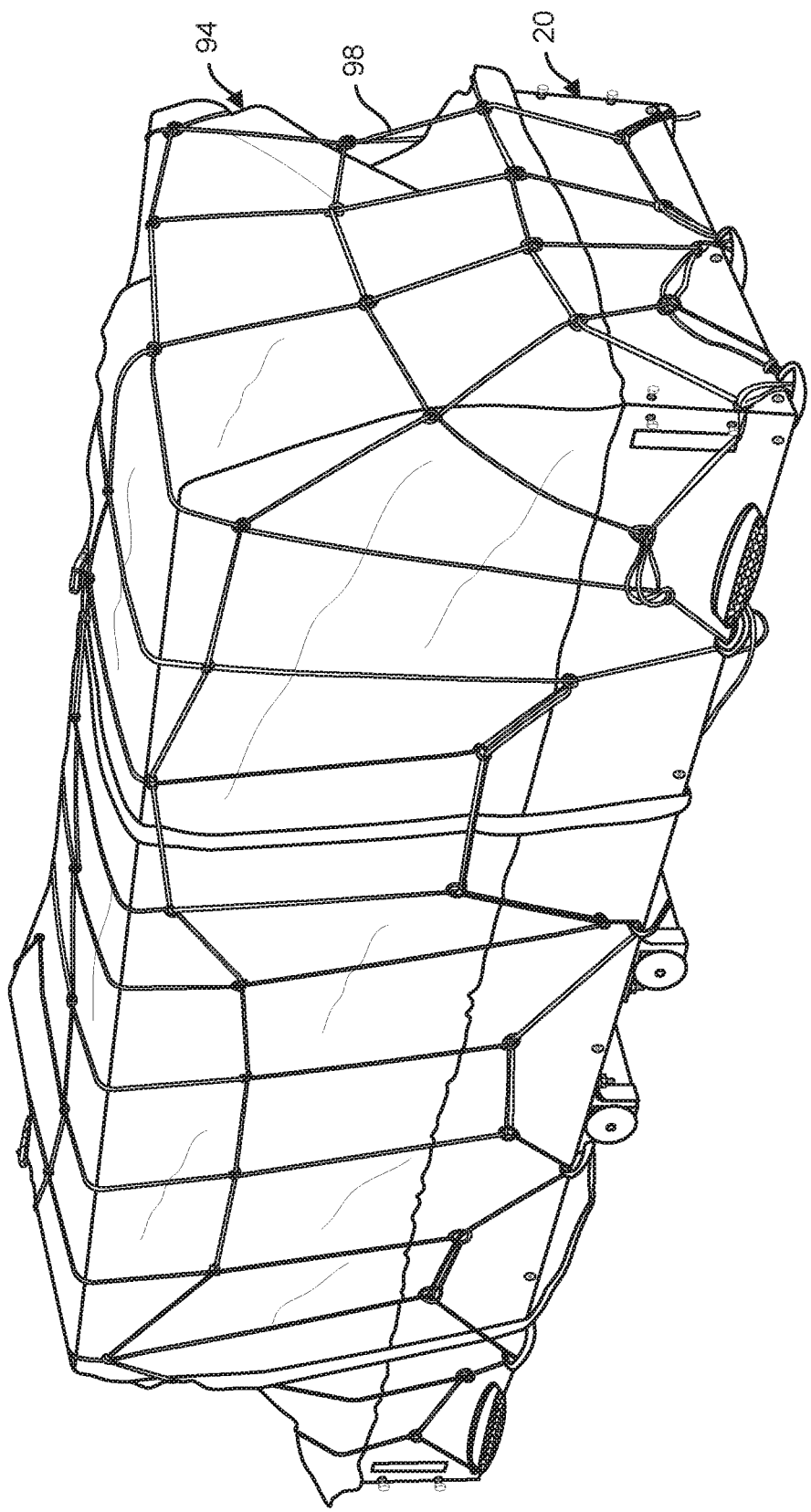

CARGO CARRIER WITH CHASSIS ATTACHMENT SYSTEM

The present application claims priority to U.S. Provisional Patent Application No. 62/272,610 filed on Dec. 29, 2015. The present invention addresses new methods for the containment of equipment and possessions, and more specifically, addresses the need for an easily configurable, easily assembled and disassembled cargo carrier with a unique system having multiple means for attachment to a chassis.

BACKGROUND OF THE INVENTION

Conventional carriers and storage solutions for equipment, tools and recreational items tend to be bulky and difficult to ship or transport. They are heavy and typically are preassembled. The present invention provides a superior cargo carrier and storage system comprising a streamlined yet strong and readily assembled modular enclosure adaptable to multiple carrier and storage applications. The present invention can be shipped unassembled in a flat container and is easily assembled by an end user. The diverse uses and applications of the present cargo carrier include open or covered enclosures for indoors or outdoors and has multifarious vehicle carrier and storage systems. In addition, the system has multiple chassis configuration systems that are easily interchangeable and can be used on cars, trucks, recreational vehicles, travel trailers or any other vehicle with a receiver type hitch or it can also be easily attached to trailer chassis systems via a unique side panel attachment system.

Cargo carriers have a long history of use with vehicles to increase the vehicle cargo capacity. These cargo carriers include, inter alia, roof top carriers, trunk mounted carriers, bumper mounted carriers, trailers, ball mounted carriers and receiver mounted carriers. Receiver mounted carriers have become increasingly popular as they can handle greater load capacity, and for ease of mounting to and removing from vehicles. These types of cargo carriers typically include a shank for insertion into the hitch receiver, locking pins for securing the shank with the hitch receiver and a platform mounted on the shank for holding the cargo.

Persisting problems with these types of carriers include durability, limited applications, capacity for adaptation to various hitch or other carrier and storage systems, and cumbersome configurations. Conventional platforms of such prior art carriers are typically metal grates welded to an angle iron frame that is welded onto cross members which are then welded onto the shank. These systems are bulky, heavy and unwieldy, and this creates problems when installing, removing and storing them. Their cumbersome, fixed "nonbreakdown" configuration and lack of adaptive features also incurs high shipping and storage costs, and the single use configuration lacks modular or fastener anchors. These prior art carriers result in persisting drawbacks regarding shipping, storage and adaptive uses.

Another problem is how to attach this type of carrier system to recreational vehicles (RV) and trailer system. Many travel trailers and RV chassis systems do not have a receiver type hitch in the rear of the chassis and so it is problematic to attach the present invention to the rear of these chassis. In addition, if a standard receiver type hitch is utilized in these chassis systems there are problems due to the excessive shake and movement behind the chassis of the larger vehicle or trailer. Therefore, there exists a need for a configurable cargo carrier system that is easily attachable to an RV chassis that is more solid and secure and that does not require the existence of a hitch type receiver.

Another problem of conventional carriers emanates from lack of tensile strength and durability needed to transport heavy or bulky cargo, including, for example, wheeled equipment, such as a wheel chair, personal mobility scooter, motorcycle, all-terrain vehicle, lawn mower or similar equipment. Moreover, loading such heavy and bulky equipment often requires a ramp or lift to which latter prior art carrier systems are not readily adaptable due to the pre-welded designs. In addition to these types of vehicles there is also a need for this additional durability to carry other heavy accessories and products, such as portable generators, grills, or other heavy items.

Thus a need persists for an adaptable, configurable and easily assembled cargo carrier that is lightweight, easily portable, easily disassembled for storage and shipping yet is high strength and able to cargo a relatively large amount of cargo.

SUMMARY OF THE INVENTION

Addressing the above problems and other drawbacks of the prior art, the present invention solves many of these problems by providing a high strength cargo carrier system that is easily assembled so that it can be stored and shipped in a knock-down configuration and then assembled by a purchaser or user. The assembled system has high strength to carry a substantial load, is easily assembled and disassembled and is easily installed and removed from a chassis. Moreover, the present invention is adaptable to multiple vehicles and a variety of chassis along with multiple carriers and storage applications. In addition, a ramp may be readily attached or integrally provided by removal or downwardly releasing a side member. The side and floor members of the cargo carrier according to the present invention are preferably comprised of sheet metal, carbon fiber, polymer, acrylic, polypropylene, or some other material suitable for the intended cargo and vehicle or storage applications. However, these members could be made from the standard mesh or grated material or any other suitable material and the material is not limited to those mentioned here.

The present invention provides a cargo carrier system that solves these and other problems. The present invention provides a high strength cargo carrier system that is easily assembled so that it can be stored and shipped in a knock-down configuration and then assembled by the user. The assembled system is high strength to carry a substantial load, but is easily installed and removed.

The cargo carrier system is comprised of knock down components that can be easily shipped with standard carriers. These components are easily assembled so that the end user can take delivery and assemble with minimal technical skills or tools required. The cargo carrier of the present invention thus is readily assembled, shipped, stored and inventoried without taking up substantial storage or warehouse space.

The present invention can also include a ramp system that can be used in connection with the subject cargo carrier system or with separate utility for other applications. The ramp system of this preferred embodiment may be hingably secured or adaptively repositionable, to create a facile, high strength ramp for loading heavy equipment, such as a wheelchair, stroller, or other wheeled or heavy equipment.

BRIEF DESCRIPTION OF THE DRAWINGS

FIG. 7A is an over/under chassis attachment for raising or lowering the height level of the cargo carrier.

FIG. 16 is an elevated rear view of the cargo carrier of the present invention with a web type covering that secures a solid material covering.

DETAILED DESCRIPTION OF THE PREFERRED EMBODIMENTS

Figure 1:
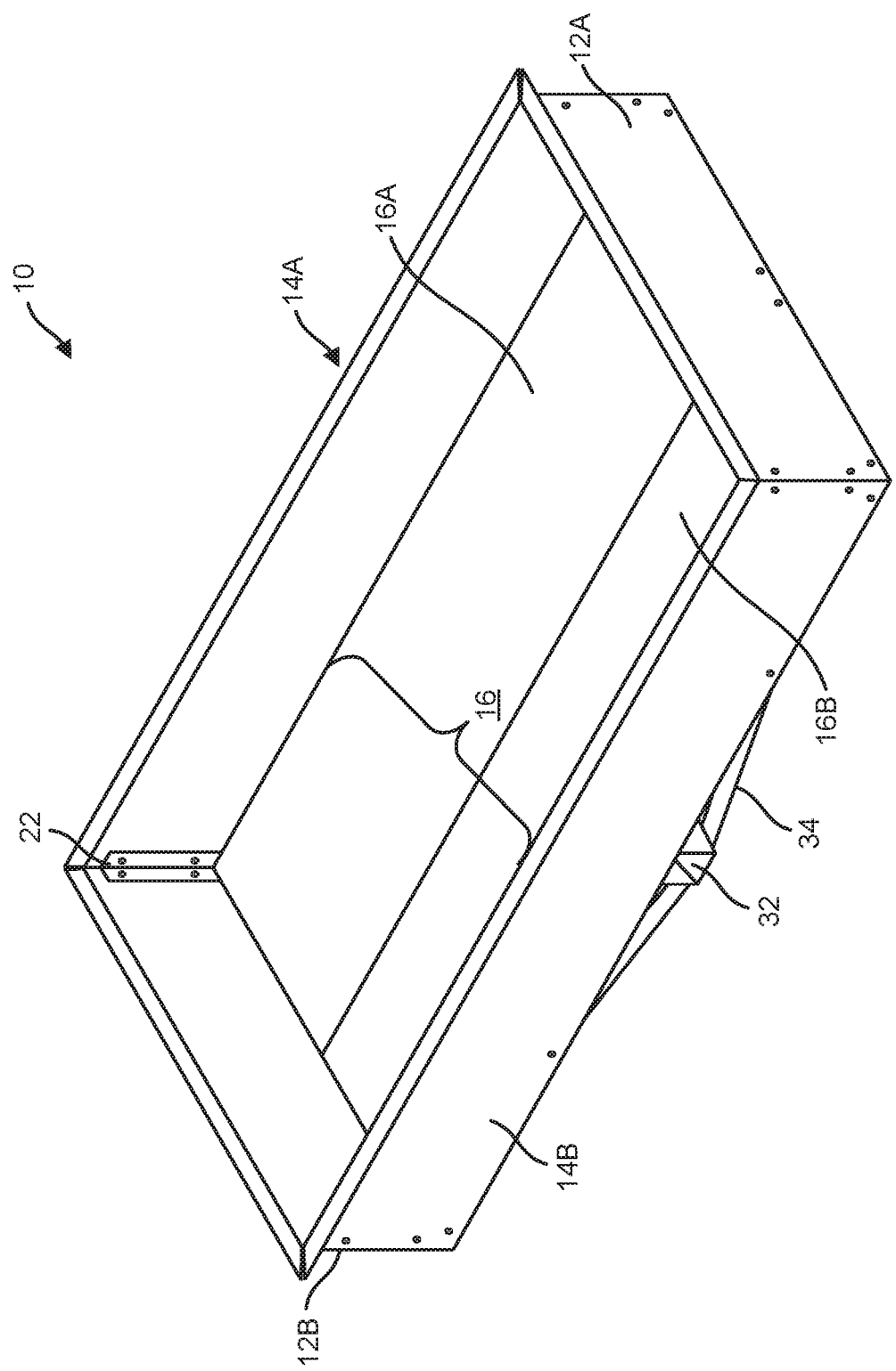
FIG. 1 is a top perspective, rear side view of the cargo carrier according to the present invention shown with the single shank member chassis attachment system attached to the bottom of the assembled cargo carrier.

These and other features of the present invention are evident from the ensuing detailed description of preferred embodiments and from the drawings.

The cargo carrier system of a preferred embodiment includes a plurality of generally planar side members fastened together with fasteners and corner braces at each corner, and along seatably mated corresponding side edges to create a strong, modular carrier system, providing a walled enclosure readily assembled and disassembled, adaptable to multiple vehicle, carrier and storage applications in addition to having an ability to be attachable to an RV or other larger frame chassis using a side member connection system.

The advantages of the present invention include, without limitation, its modular construction that can be shipped in as few as four planar side members, fasteners, corner braces, chassis attachment system and accessory ties, cords, etc. The side and bottom members are secured in fixed perpendicular alignment by a fastener means affixed along or proximate to the member edge whereby the four side and bottom members are cohesively braced together to provide a fortified, self-supporting structure. In preferred embodiments of the present invention, such integrated, fortified edge fastening of the enclosure's side and bottom members by securing their respective side edges to bottom flanged edges which may be integrated in the carrier enclosure members such as depicted in the accompanying drawings.

Referring to a first embodiment illustrated in FIGS. 1-6, the cargo carrier parts and assembly itself will be described. The cargo carrier 10 used for all attachment systems includes very few parts. Generally, it has four side members 12A, 12B, 14A and 14B, either one or two floor members 16, corner braces 22, and a single mounting tube 32. Specifically, the first embodiment teaches a configurable, easily assembled and disassembled cargo carrier that has at least one floor member 16 with at least one downward facing flanged edge 42, at least two side members 14A, 14B where each side member has an outward facing flanged top edge 42 and an inward facing flanged bottom edge 44, at least one corner brace 22 to securedly connect one of the side members to another of the side members, thereby forming a corner of the cargo carrier 10, fasteners 46 for securing the floor members 16 to the side members 12A, 12B, 14A and 14B and the corner braces 22 to the side members 12A, 12B, 14A and 14B and a chassis attachment system for securing the assembled cargo carrier to a chassis. In this configuration, the cargo carrier 10 could have either one or two floor members 16. First, the box assembly will be described.

The floor members are typically planar panels that are longer than they are wide. In this embodiment, as in the following embodiments, these floor panels are a flat surface that can either be solid, grated, latticed, or any other style or design. These panels have four sides and in the preferred embodiment the sides all have a downward facing flanged edge 40. This edge serves several purposes. First, it adds extreme rigidity and structure to the originally flat panel floor member. This flanged edge allows the panels to be more solid and to withstand more carrying capacity. In the first embodiment, the flanged edges can also have a plethora of holes for use with fasteners. Next, this flanged edge 40 provides an easy attachment mechanism, that will be explained next.

Figure 3:
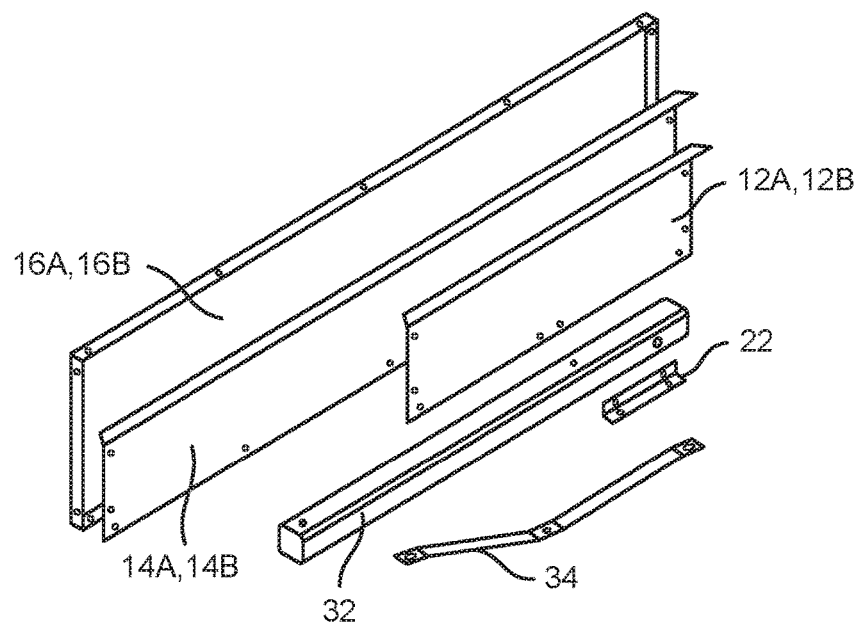
FIG. 3 is an exploded view of the parts comprising the present invention prior to assembly.
Figures 3A, 3B:
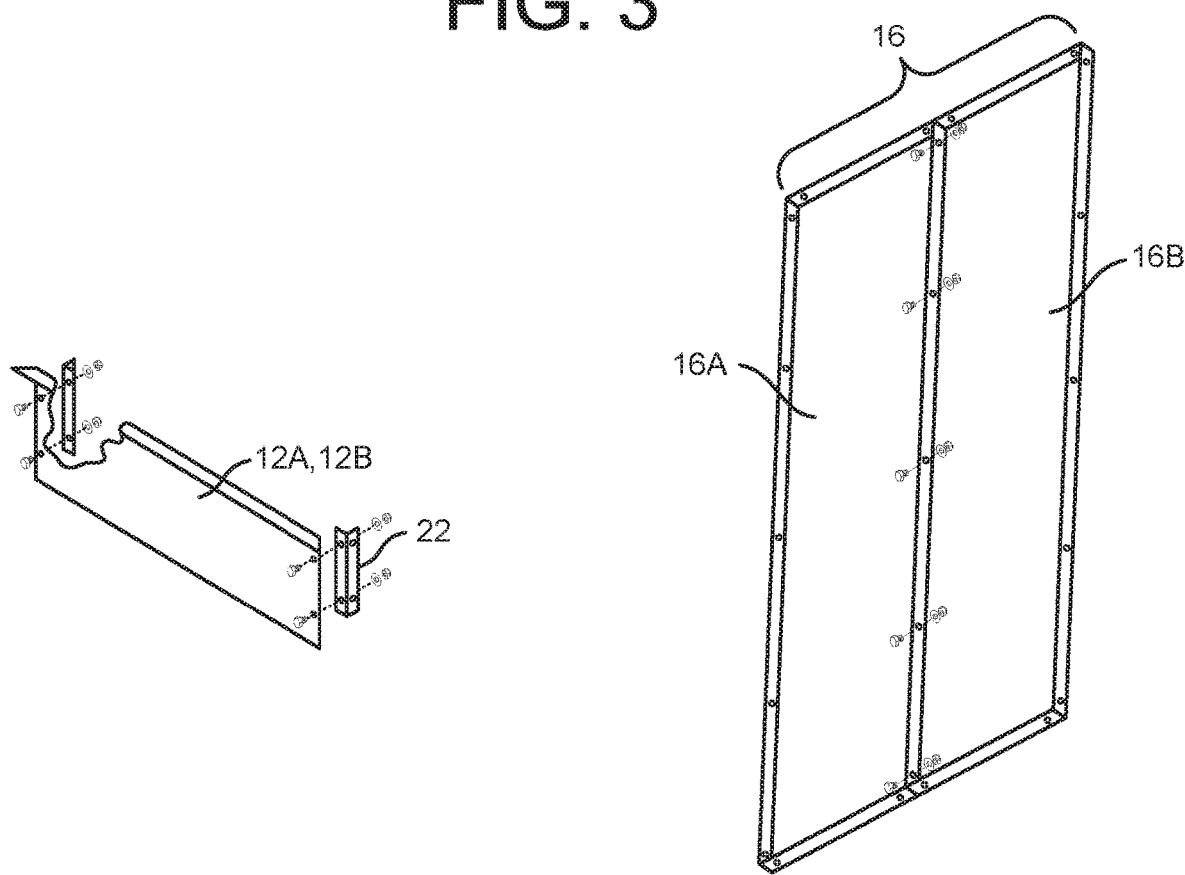
FIG. 3A is an exploded view of corner braces.
FIG. 3B is an exploded view of floor members.
Figure 3C:
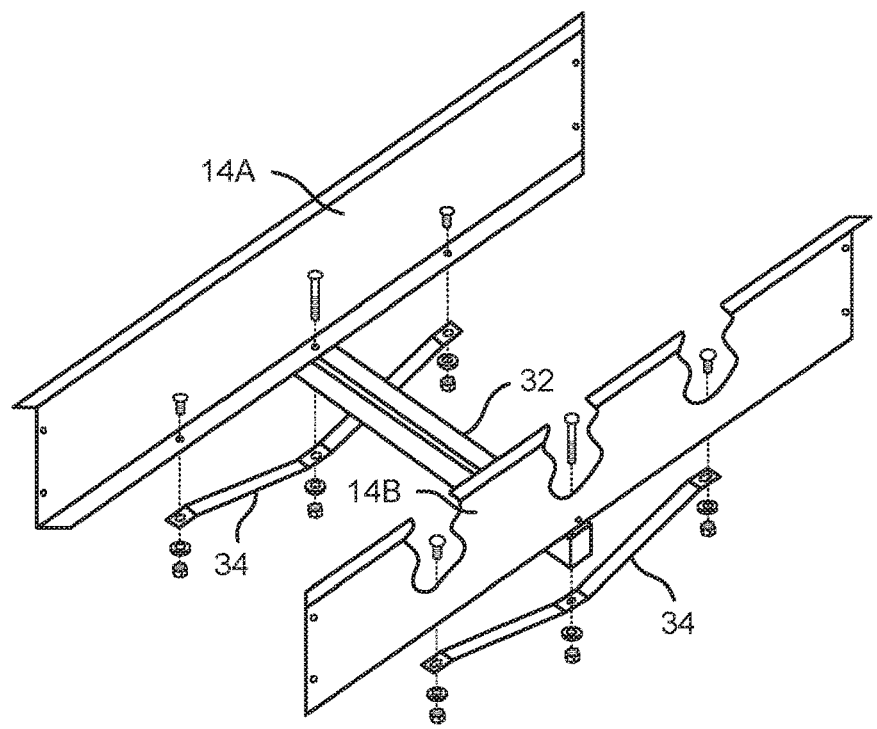
FIG. 3C is an elevated topside view of the parts of the present invention.
Figure 3D:
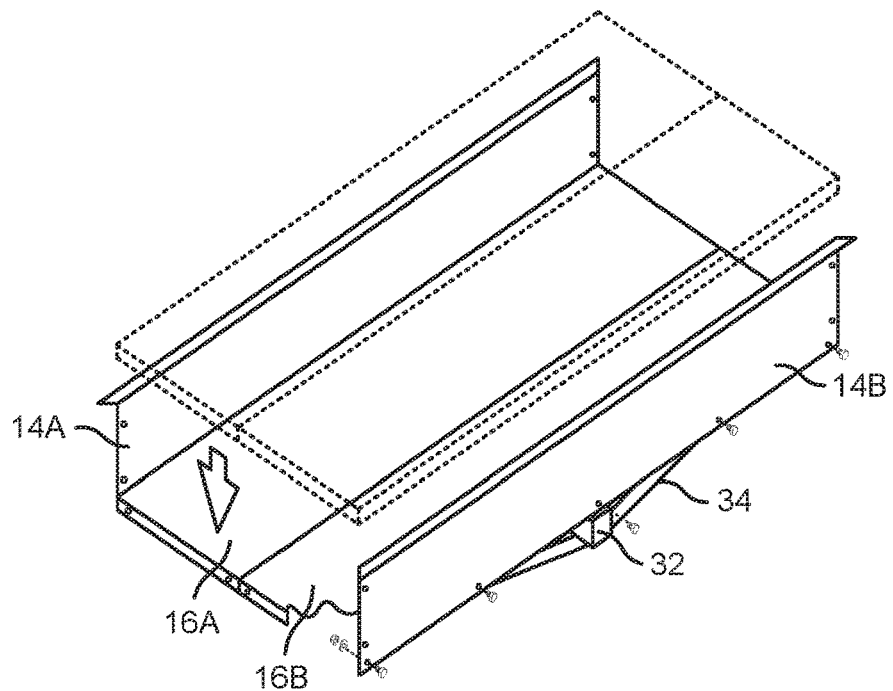
FIG. 3D is an elevated, exploded view of the cargo carrier of the present invention.
Figure 3E:
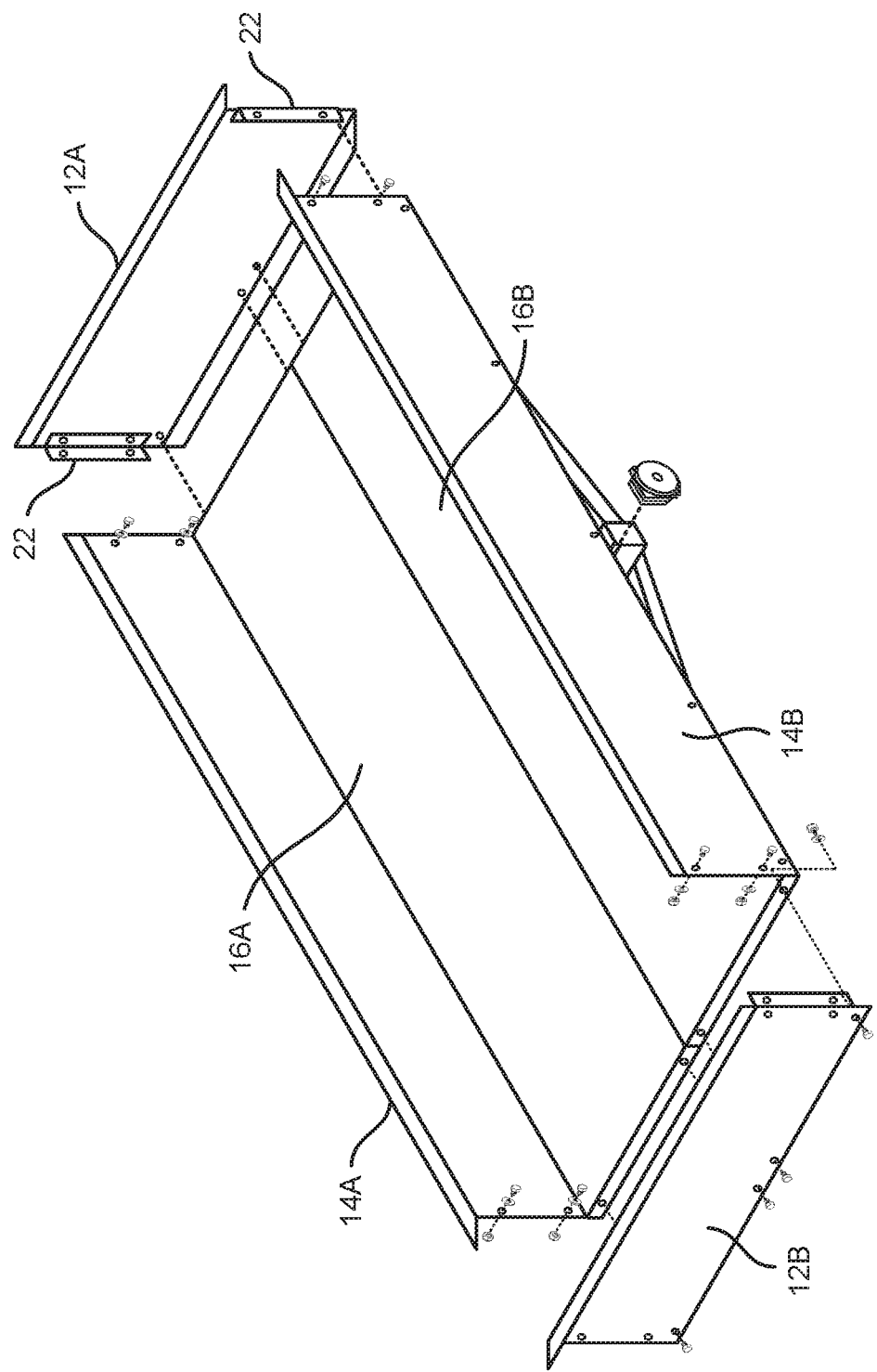
FIG. 3E is an exploded rear view of the carrier shown in FIG. 2.
Figure 4:
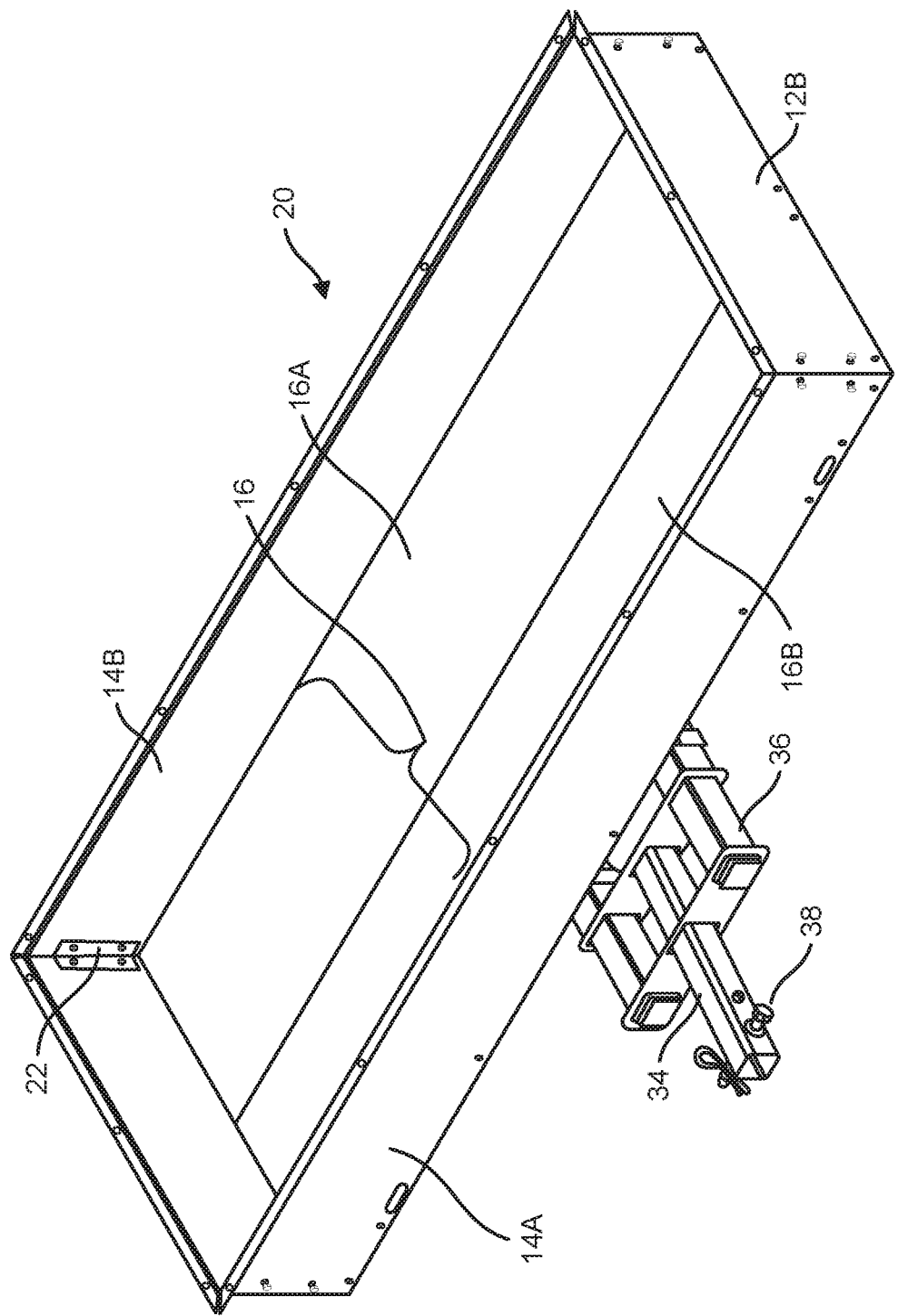
FIG. 4 is an elevated, frontal view of the cargo carrier of the present invention with the twin tube chassis attachment system installed.
Figure 5:
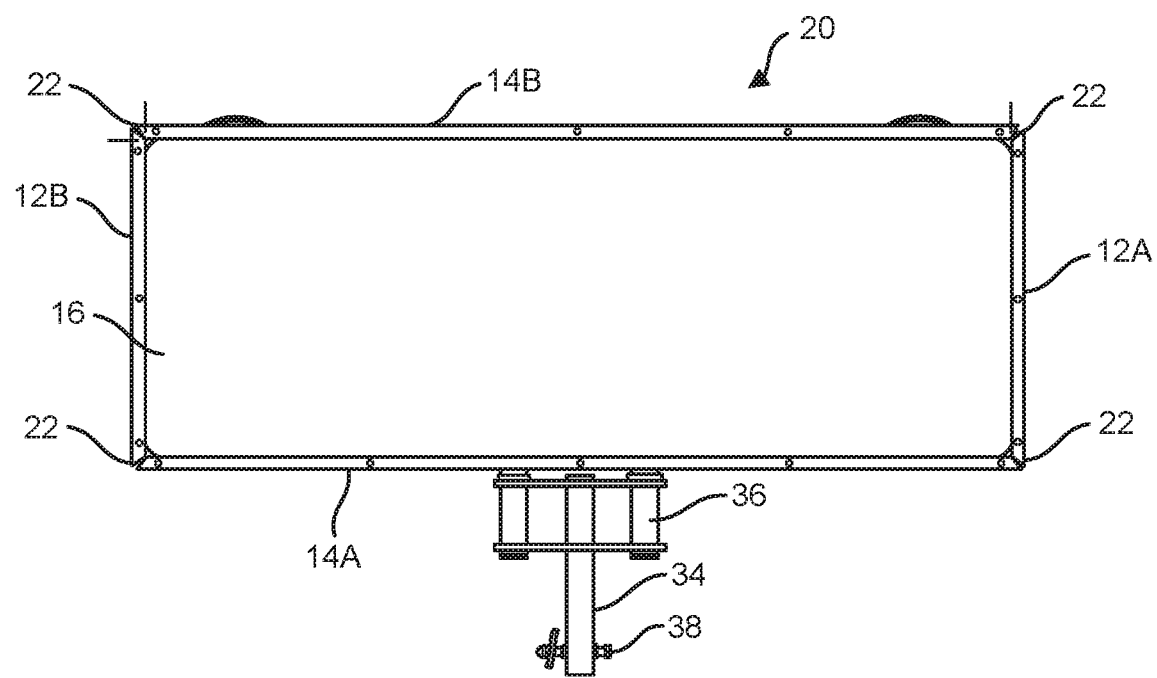
FIG. 5 is a top side view of the cargo carrier with the twin tube chassis system installed.
Figure 6:
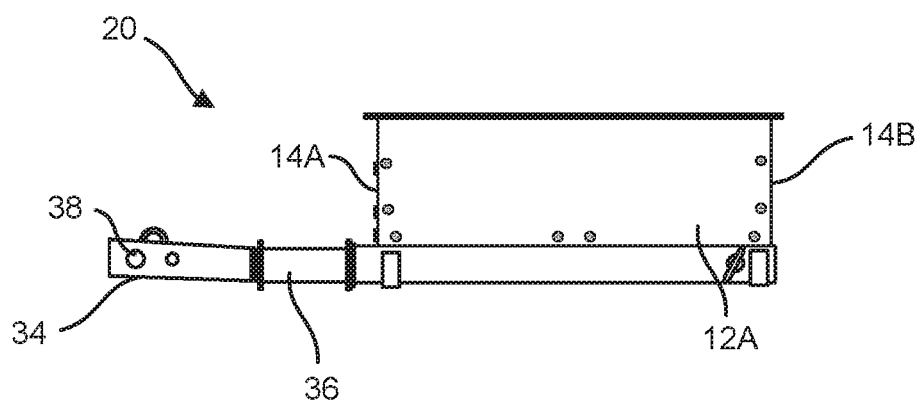
FIG. 6 is a side view of the cargo carrier of the present invention with the twin tube chassis attachment system installed.
Figure 7:
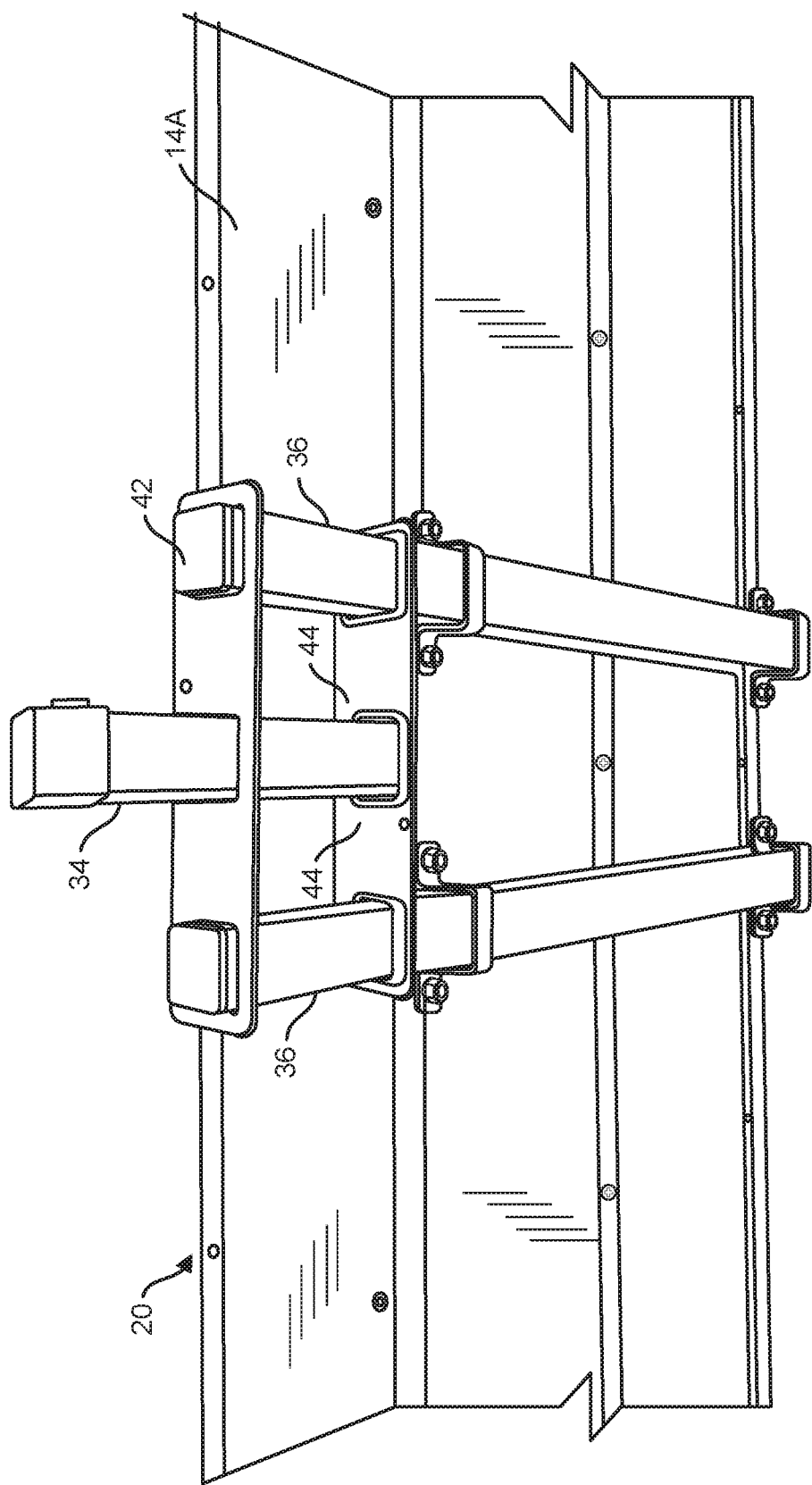
FIG. 7 is a bottom view of the cargo carrier of the present invention with the twin tube chassis attachment system installed.
Figure 8:
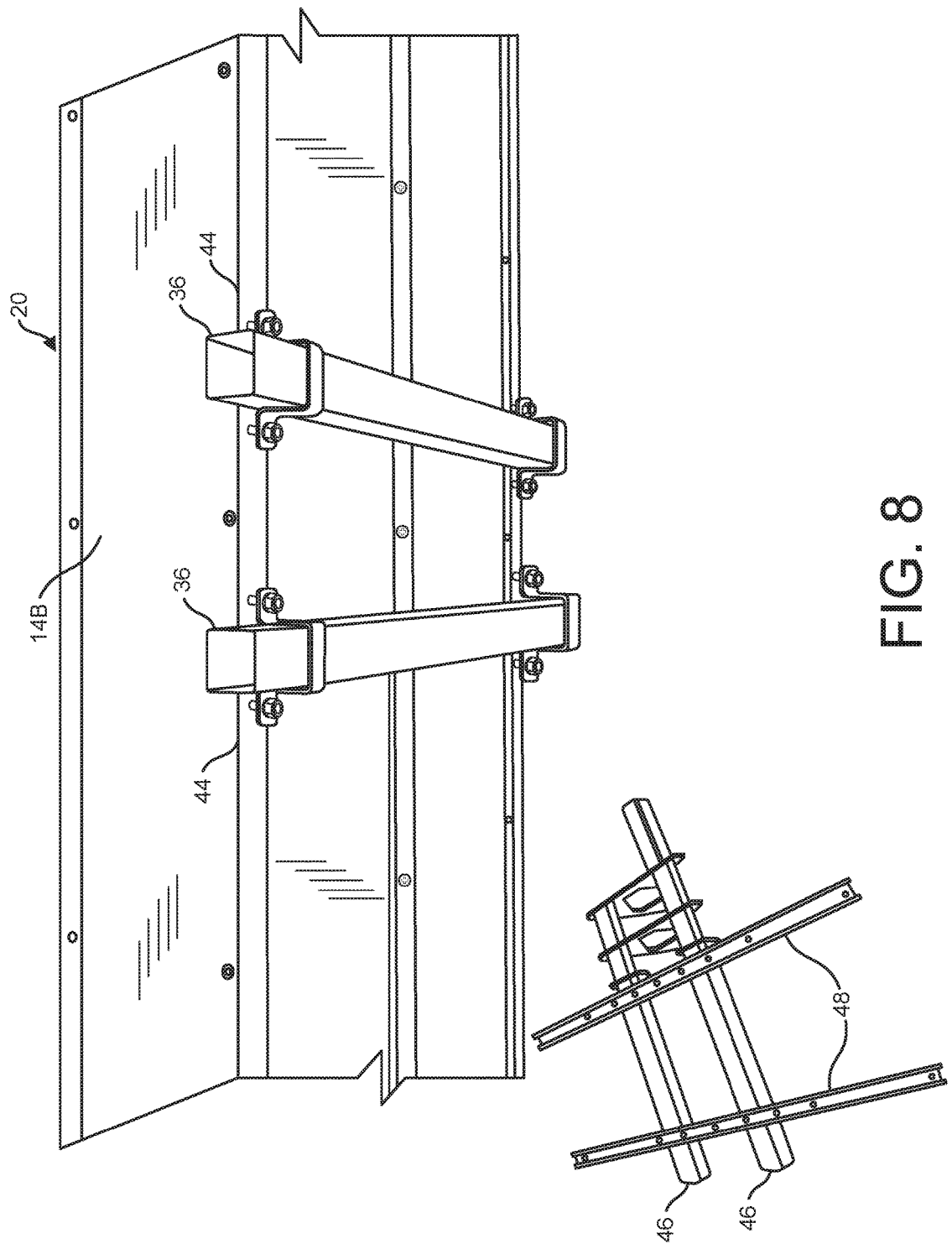
FIG. 8 is another bottom view of the cargo carrier of the present invention with the twin tube chassis attachment system installed.
Figure 9:
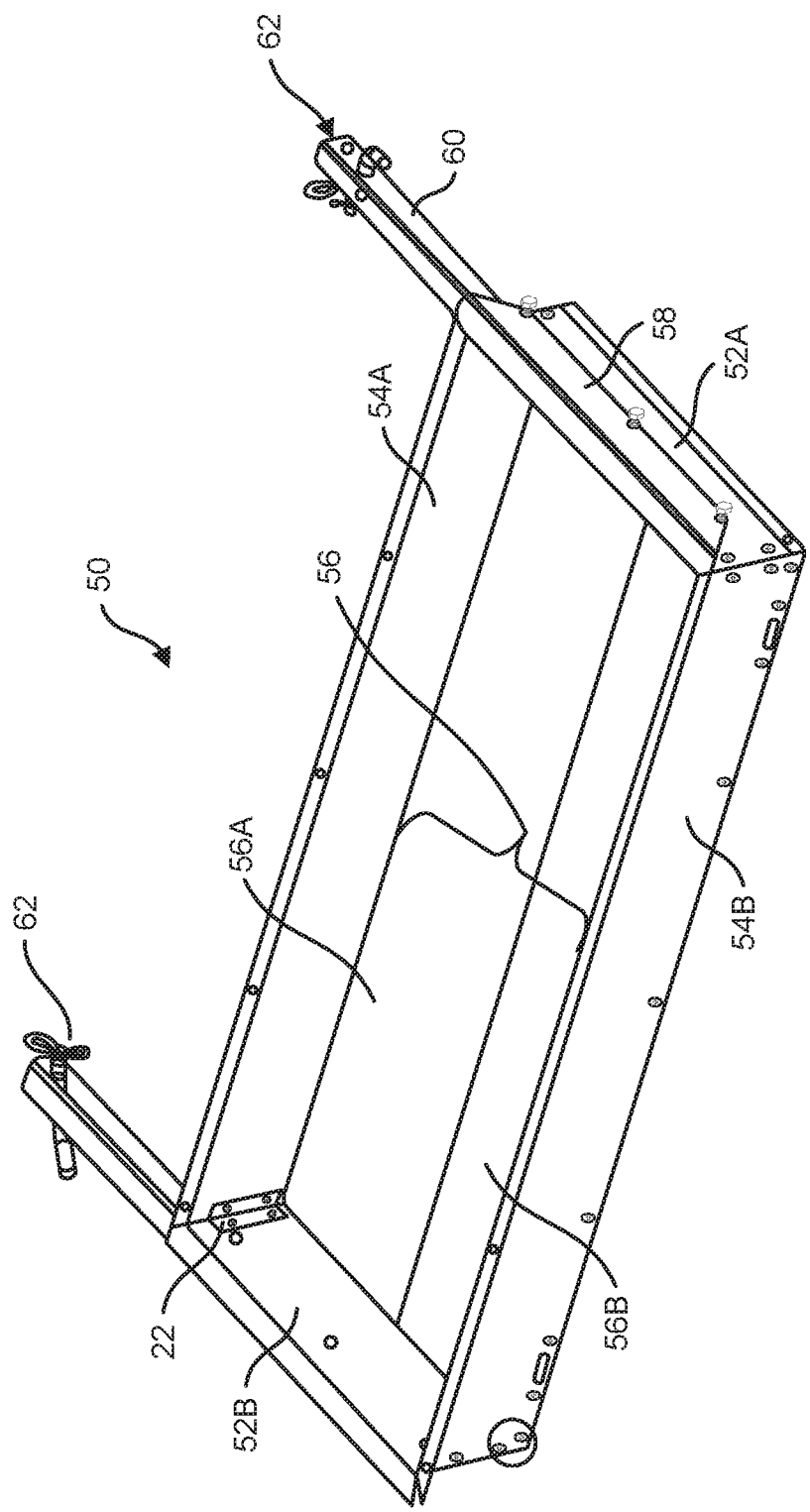
FIG. 9 is an elevated topside view of the cargo carrier of the present invention with the chassis side mount system installed.
Figure 10:
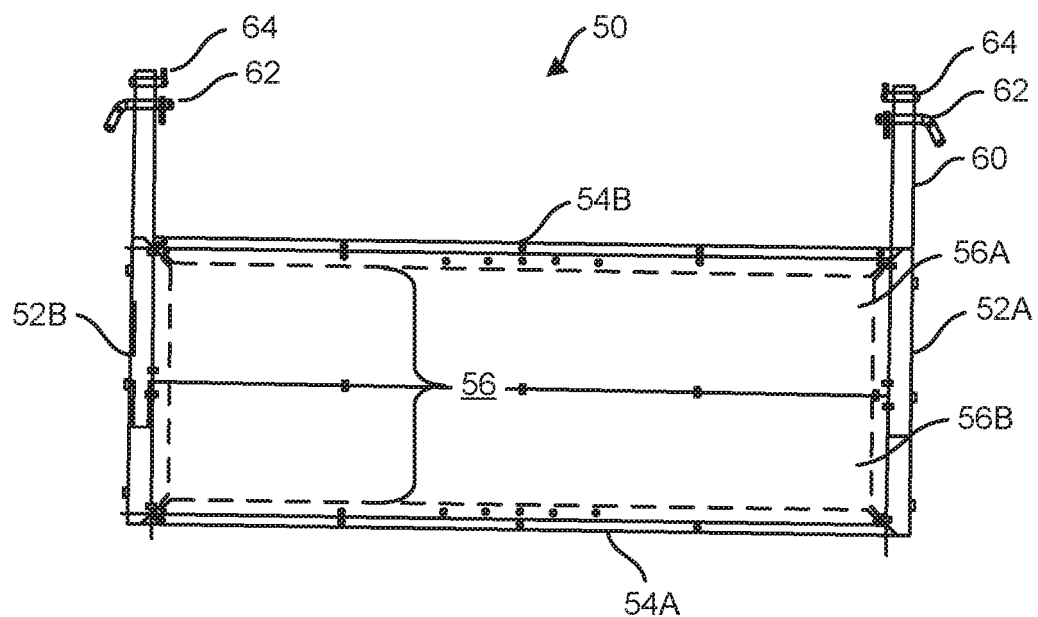
FIG. 10 is a top side view of the cargo carrier of the present invention with the chassis side mount system installed.
Figure 11:
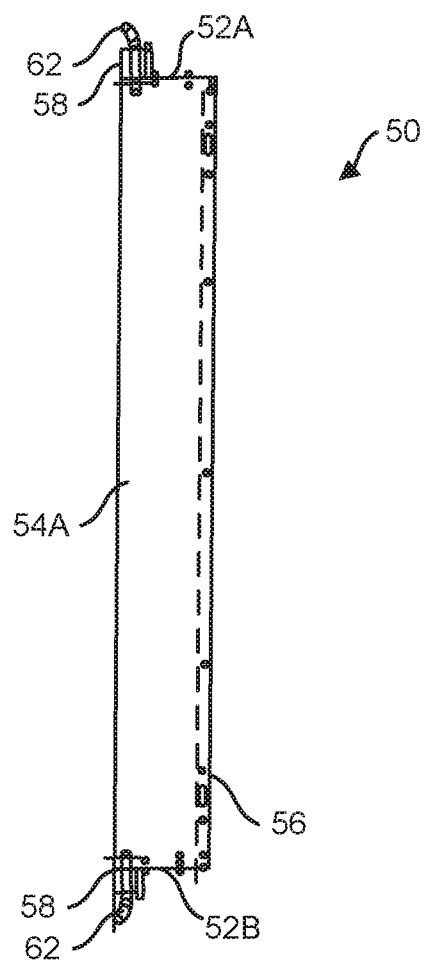
FIG. 11 is a side view of the cargo carrier of the present invention with the chassis side mount system installed.
Figure 12:
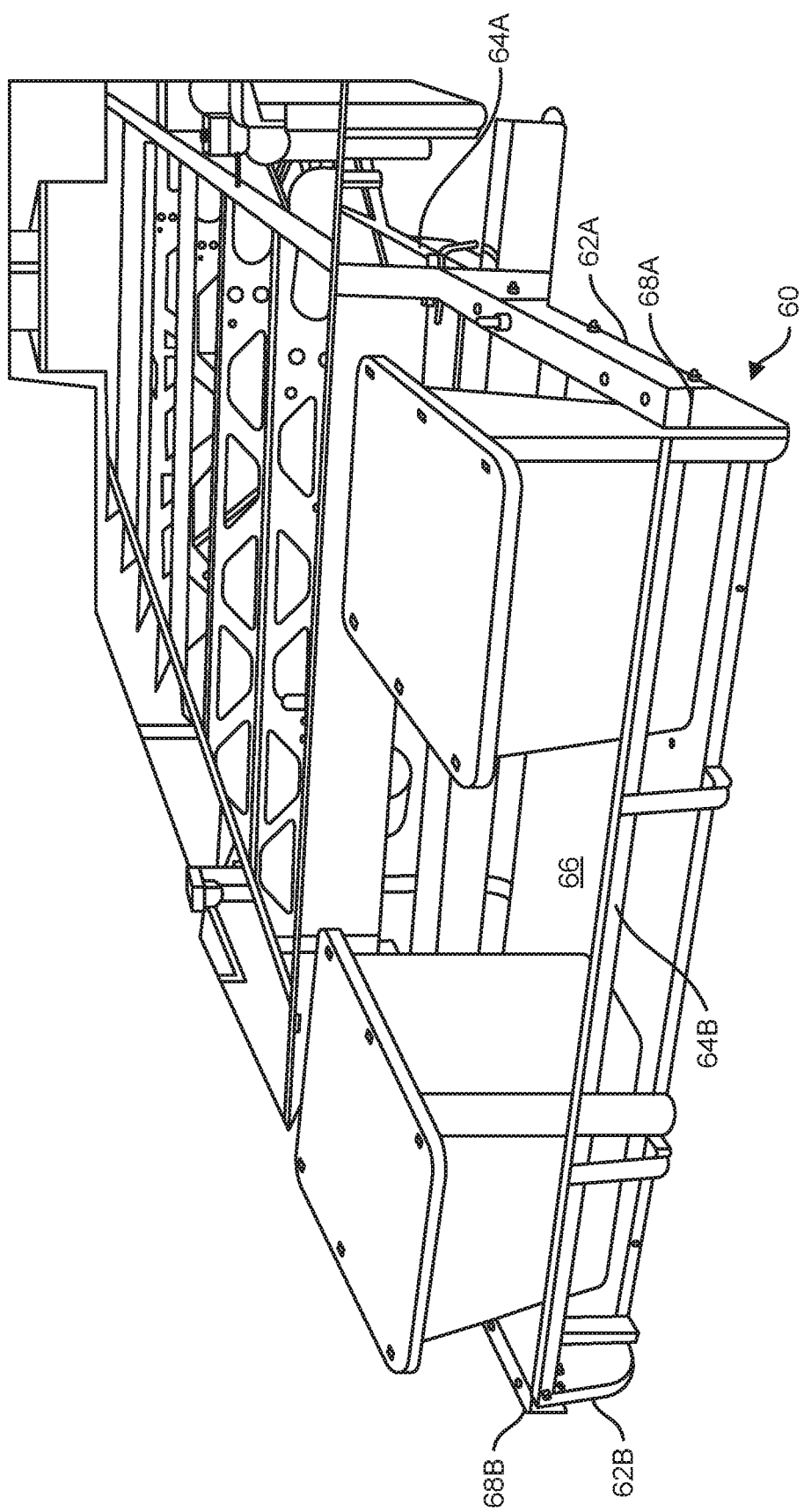
FIG. 12 is an elevated view of the chassis side mount system installed to a recreational vehicle chassis.

Side members in this embodiment are typically planar panels as well. In this embodiment, as in the following embodiments, these side member are a flat surface that can either be solid, grated, latticed, or any other style or design. These panels have four sides and in the preferred embodiment the sides all have two flanged edges. The first flanged edge is an outward facing flanged top edge 42. This flanged edge 42 serves at least two purposes. First, it provides additional strength and rigidity to the side member. Also, in addition to this, it provides a platform for mounting additional structures to the top of the cargo carrier 10 such as soft cover, a hard cover, or other cargo management systems. This top edge can also have holes for use with and securement of the additional structures. The side member then has a second flanged edge on the bottom. This is an inward facing flanged bottom edge 44. This edge is important again for a couple of reasons. Again, it adds yet further rigidity and stability to the side members, but it also adds a mounting platform for which the bottom member's flanged bottom edge 40 rests. As can be seen in FIGS. 3 and 3B, the floor member has curved sides that form the flange along all the perimeters of all the floor members. For securement to the side members this side flanged, downward facing edge rests upon the inward facing side edge of the side member. Then, the downward facing flanged edge has holes that mate with holes in the side members through which the fasteners are inserted and tightened to securely fasten the floor members to the side members. This by itself forms a solid, rigid, and secure cargo carrier box. Next, the corner braces 22 are put in place. The braces also have holes that are mated to additional holes in the side members through which the fasteners are inserted and tightened. Once the braces are tightened and the side members are secured to the floor members the easily configurable and assembleable cargo carrier is completed.

Figure 2:
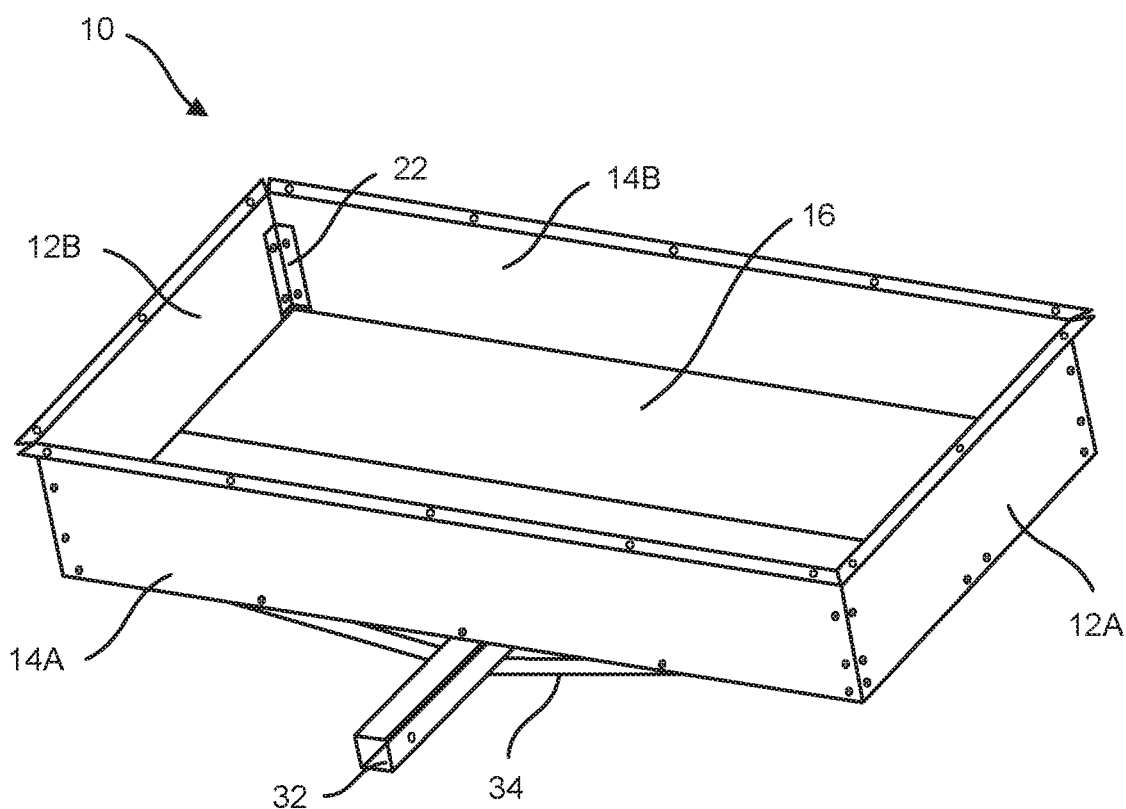
FIG. 2 is a perspective, frontal view of the preferred embodiment fully assembled showing the single hitch tube shank member attached to the bottom panels of the assembled cargo carrier.

Next, the first chassis mounting system will be described. The first chassis mounting system is the simplest and easiest of all the configurations. This system is a receiver type hitch mounting system and is herein defined and described as a shank member mounting system. As can be seen in FIGS. 1-3 this shank member system has a straight, single mounting tube 32 that is positioned at approximately a center of a bottom of the assembled cargo carrier 10 where this mounting tube has a first end that is affixable to a rear of the cargo carrier; a middle that is affixable to a front of the cargo carrier 10; and a second end that is insertable within the receiver type hitch; and at least one enforcement strap 34 affixable to the bottom of the cargo carrier on either side of the mounting tube and preferably to the mounting tube itself. In this configuration, the single mounting tube is typically affixed to the bottom of the cargo carrier 10 with the enforcement strap 34 or some other type of attachment apparatus. Typically, the single mounting tube can extend slightly past the rear end of the assembled cargo carrier and can extend slightly forward of the front end of the assembled cargo carrier 10. This allows for some adjustment of the attachment to the bottom of the cargo carrier. The single mounting tube provides additional support for the bottom of the cargo carrier as well as serving as the attachment means to the hitch mounted receiver. The enforcement strap 34 serves to securely affix the single mounting tube 32 to the cargo carrier 10. This enforcement strap 34 can be of differing widths but should be at least wide enough to sufficiently secure the single mounting tube 32 to the cargo carrier 10. This system is typically secured to the cargo carrier 10 on either side of the mounting tube 32 and it is also typically secured to the mounting tube 32 as well to provide additional stability and securement.

This first chassis mounting attachment system typically utilizes the cargo carrier and cargo carrier assembly as fully described above and so the description of assembly and the cargo carrier itself will not be reiterated here.

The second embodiment of the second chassis mounting system is shown in FIGS. 4-8. This system utilizes a twin tube design. Specifically, the embodiment utilizes the configurable cargo carrier 10 described above but where the shank member system has at least two straight, outside mounting tubes 46, each of these tubes having a pair of first ends that are affixable at an approximate rear of the cargo carrier system and a pair of second ends that are affixable at an approximate front of the cargo carrier 10. This system further has a spine having a pair of spine tubes 36, a pair of spine plates 44, and a shank 34 where the spine plates securely join the spine tubes 36 to the shank 34 and where the pair of spine tubes 36 are insertable into said each of the mounting tubes 46 and where the shank 34 is insertable into the receiver type hitch. Typically, the pair of outside mounting tubes 46 are secured to the bottom of the cargo carrier 10 using hat brackets or some other type of similar securement device, connector or apparatus.

Unique to this embodiment is a more generous adjustability due to the fact that it utilizes the twin tube design. The pair of mounting tubes 46 are as long as the entire front to back of the cargo carrier base and when the pair of spine tubes 36 are inserted into the mounting tubes 46 they can be adjusted along the length of the mounting tubes. In other words, the insertable spine tubes 36 can be as long as the mounting tubes 46 so that they can be slid in and out of the mounting tubes 46 thus allowing for great adjustability. It is also desirable to have some sort of stopping mechanism to prevent the spine tubes 36 from entirely sliding out of the mounting tubes 46. This can be a cable, a chain, a pin or any other apparatus to prevent total disengagement. In addition to its adjustability this mounting system also provides exceptional stability due to the wider, twin tube design.

The last chassis mounting embodiment is shown in FIGS. 9-12. This system utilizes the same cargo carrier 10 as described above but rather than using a hitch mounting system attached to the bottom of the cargo carrier 10 this system uses a side mounting configuration. Specifically, in this embodiment there is the configurable cargo carrier 10 as described above where the chassis attachment system is a side member mounting system that is attachable and removable from at least one side of the cargo carrier and from the chassis. Typically, this type of attachment system is utilized and used with Recreational Vehicles or larger vehicle frame chassis. In this embodiment, the side member mounting system has at least one side member that is approximately the length of the cargo carrier side where an upper portion of this side member is a receiver channel that is has a return that is substantially U-shaped. This U-shaped receiver channel has at least two holes formed in opposing sides of the channel and at least one fastener is inserted through the two holes. These holes are typically linearly placed on either side of the channel. This simple but extremely effective system works to easily attach the cargo carrier 10 to the chassis. In order to complete the attachment there is at least one tilt bracket that is secured to the chassis. These are preferably attached to the either side of the chassis and the cargo carrier is preferably designed to have a width that matches the width of the chassis so that it can align with the tilt brackets. Further, there is at least one tilt tube 60 and this tilt tube 60 is tiltably affixable to the tilt bracket. Next, an inner side of the receiver channel 58 matingly fits over the tilt tube 60 and the receiver channel is secured about the tilt tube 60 by tightening the fasteners so that they secure the channel using compression. Other means of fastening the receiver channel 58 around or to the tilt tube 60 are also acceptable but the compression fitting allows for easier adjustability. In other words, the fasteners compress opposite sides of the channel member about the tilt tube so that when loose the side member is adjustable on the tilt tube but when tightened the side member is securedly affixed to the tilt tube.

This side mount system could further be described as follows. The final embodiment includes a configurable, easily assembled and disassembled cargo carrier having at least one floor member having a perpendicular downward facing flange along a periphery where said downward facing flange with spaced apart floor member receiver holes; four side members configured for aligned attachment along the periphery of the floor member, wherein each side member has a perpendicular outward facing flanged top edge, and a bottom flanged edge with receiver holes in spaced apart correspondence with said floor member receiver holes for fastening said side members to said floor member to form an open enclosure, and wherein said side members have corresponding side edges with side edge receiver holes; a receiver channel provided along a length of opposing outward facing surfaces on at least two of said side members; four corner braces having brace receiver holes in spaced apart correspondence to said side edge receiver holes to secure corresponding side edges of the side members in abutted perpendicular alignment; fasteners for securing through tightened engagement with corresponding floor member receiver holes of said mounting portion to said bottom edge receiver holes of said side members and for securing said corner brace receiver holes to said side edge receiver holes of said side members to form an open enclosure.

The cargo carrier of as defined above could further having two chassis attachment rails configured in parallel orientation for securable attachment to the receiver channel of the side walls to thereby attach the cargo carrier to a chassis. Also, the cargo carrier could also have further a removable cover detachably securable about the side members of the cargo carrier. Finally, the cargo carrier could have a removable container detachably securable within the side members of the cargo carrier.

Embodiments of the present invention further include fastener anchors, such as, for example, flutes, hooks, perforations, on the corners of the side members or otherwise oriented on the enclosure for cord locks and bungees to facilitate securing equipment or a top cover of the enclosure. The present cargo carrier also has important attributes involving content protection, along with loading and mobility features. For example, when a side member is removed for loading or any other purpose, a U-shaped bolt may be employed to sufficiently fortify the adjacent sides thereof.

The illustrated embodiments of the present invention illustrate a container having solid sides, ends and bottom with an open top enabling loading, or insertion of variously shaped and sized loads. However, it is also possible to have bottom members and side members made from other materials that are not solid, such as a latticed material or any other material that will provide sides and bottom members.

Figure 14:
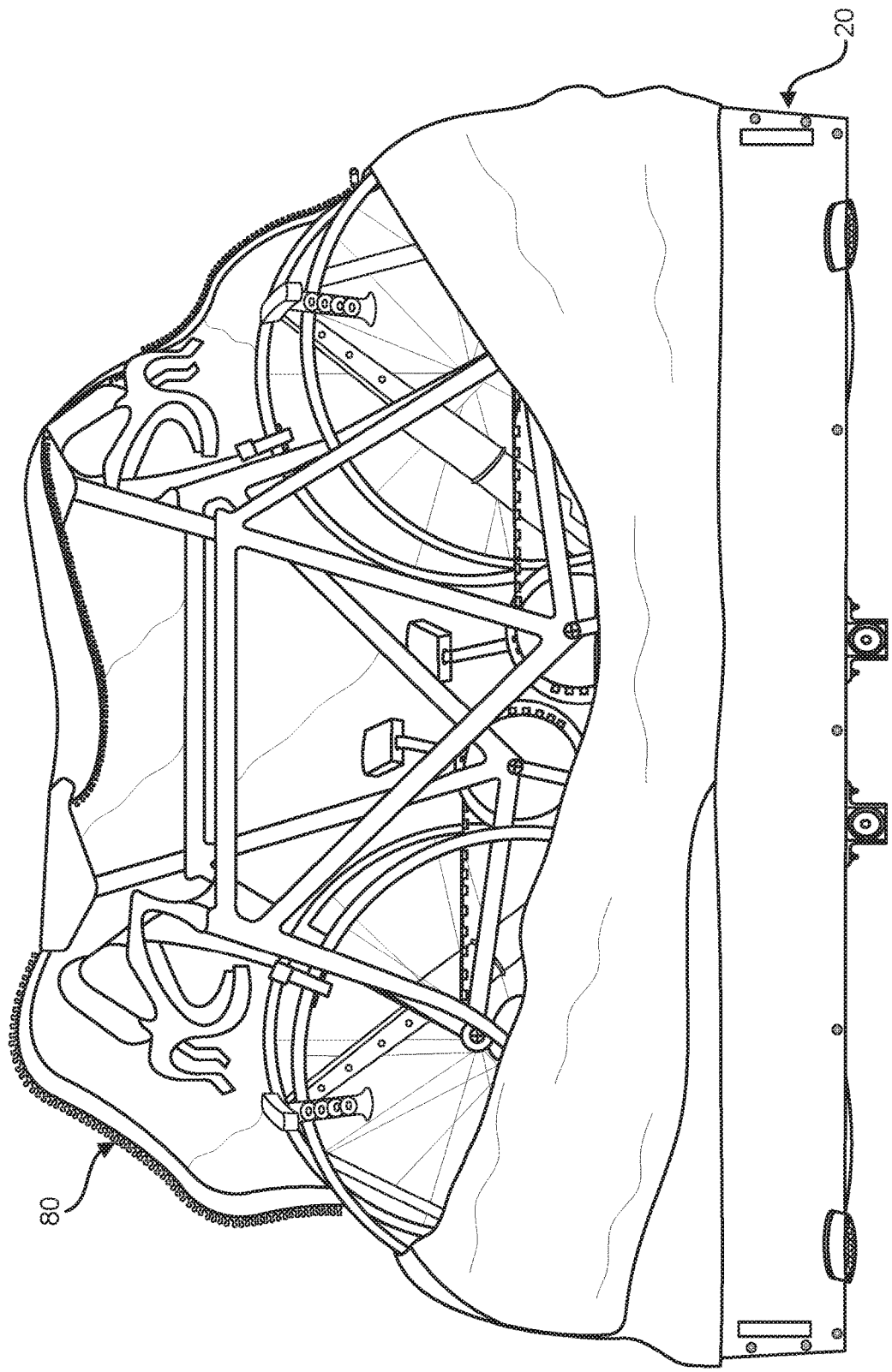
FIG. 14 is a rear view of the cargo carrier of the present invention with a V-shaped bicycle/cargo rack installed in the cargo carrier, with two bicycles attached to the rack and a soft bicycle bag partially covering the bicycles.
Figure 14A:
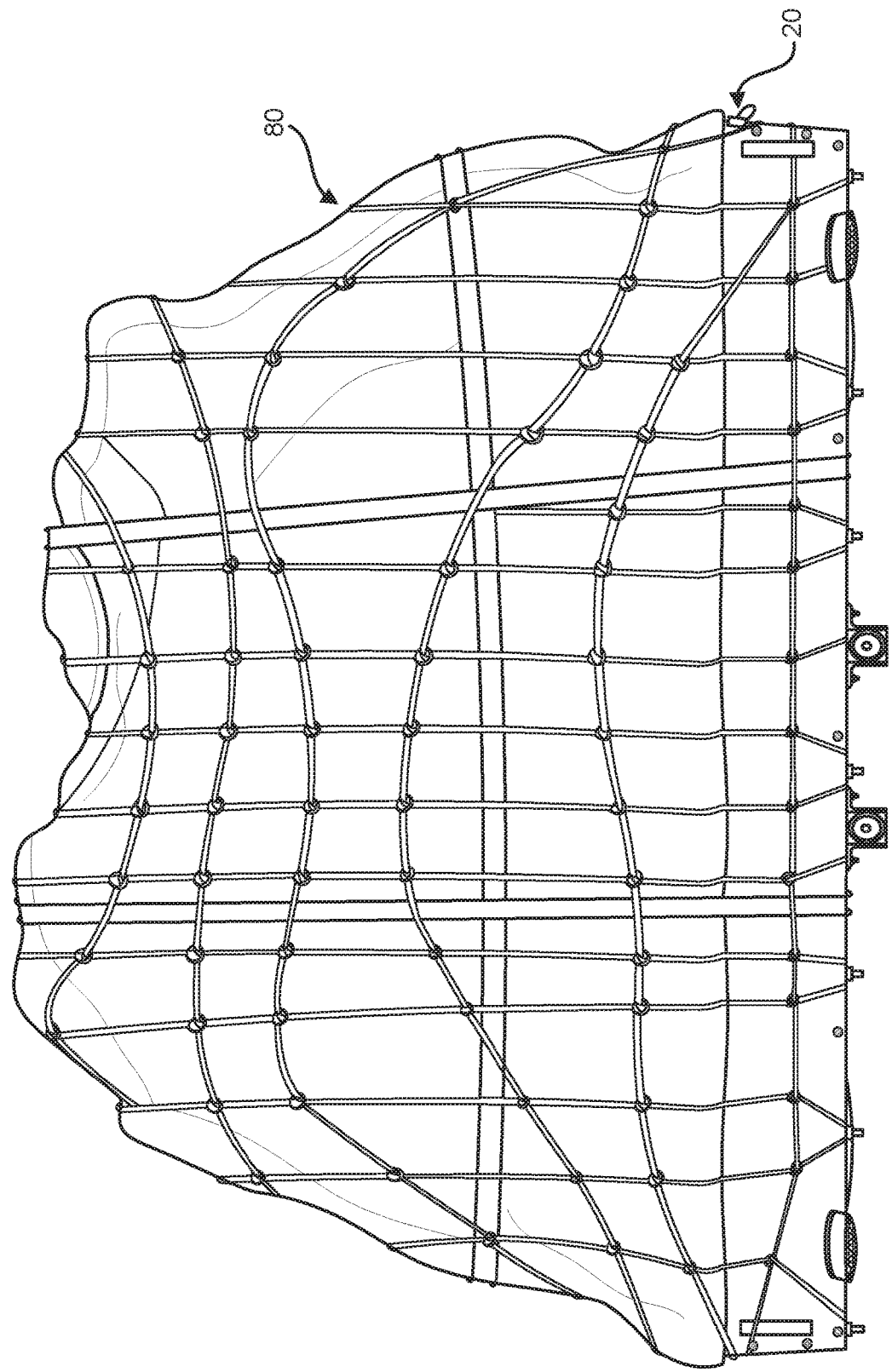
FIG. 14A is a rear view of the cargo carrier of the present invention with a V-shaped bicycle/cargo rack installed in the cargo carrier, with two bicycles attached to the rack and a soft bicycle bag entirely covering the bicycles along with a web type securement cover.
Figure 15:
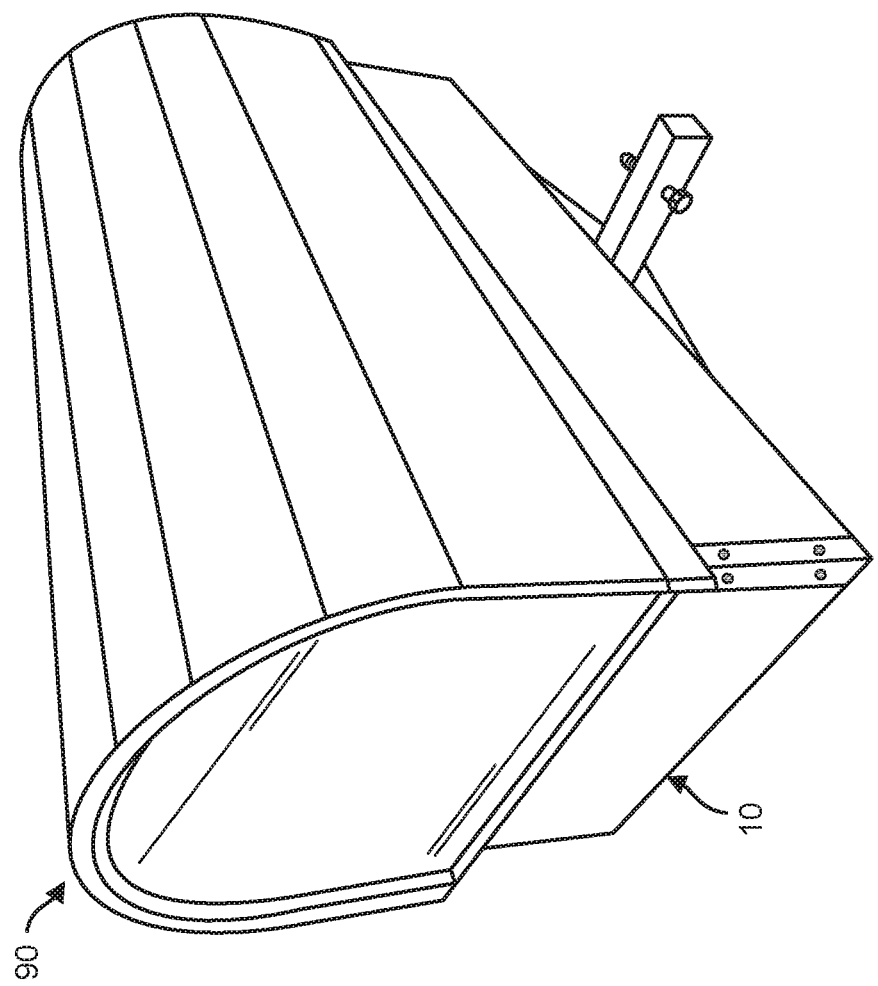
FIG. 15 is an elevated view of the chassis hitch mount system with a hard cover system installed.
Figure 16A:
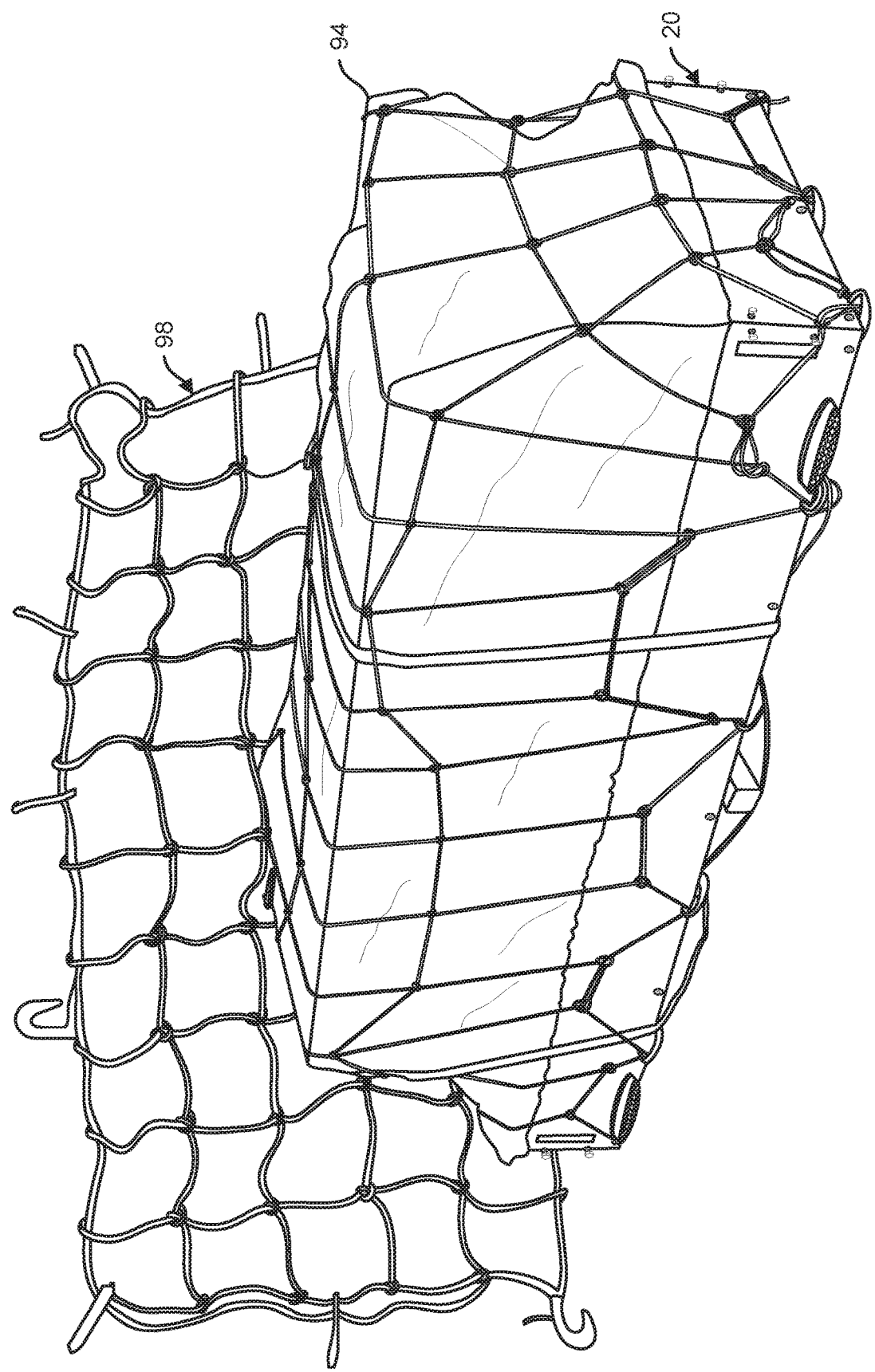
FIG. 16A shows the covering system of FIG. 16 along with an image of the web type covering partially removed.
Figure 16B:
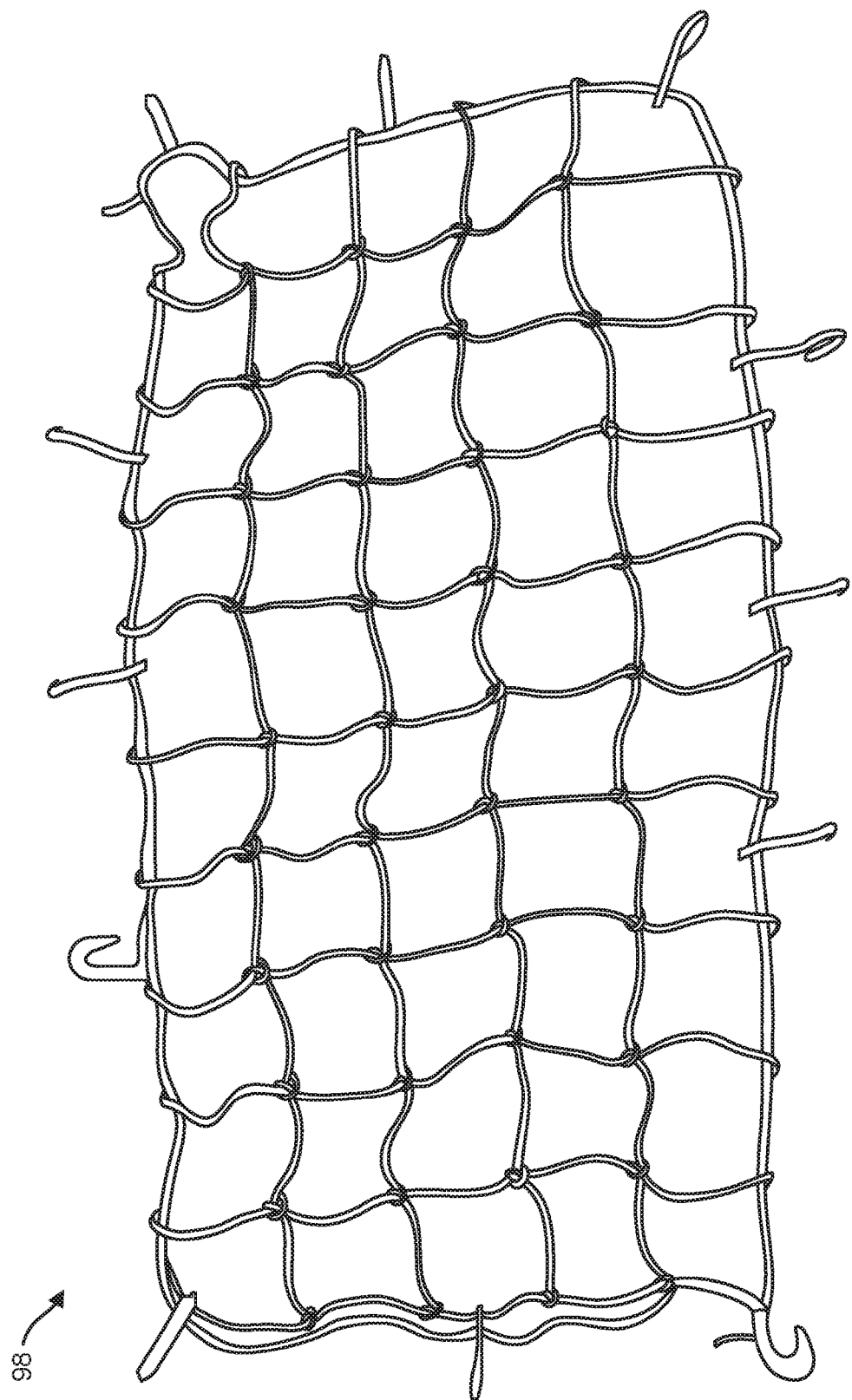
FIG. 16B is the web type covering with attachment hooks.

As shown in FIGS. 14 through 16, in any of the above described embodiments the open container may have or use a variety of covers, such as a waterproof textile cover with loops or holes for detachable insertion of corresponding hooks, loops or ratchets. The cover may be comprised of an expandable, bungee material providing additional flexibility for securing variously sized cargo. This bungee material can be formed in a type of webbing and additionally the webbing can be made from a rope material or any other material that can provide a web type cover. Alternative embodiments may further utilize latticework, rods or horizontally extendable walls to support taller cargo loads, and include optional covers, or employ ropes, bungee cords or straps adaptable to the shape and size of cargo. In yet further embodiments, a cover may comprise a solid material fitted to the dimensions of the open top. Any of the coverings are usable with any of the embodiments and the cover configurations are not limited to those set out herein.

Figure 13:
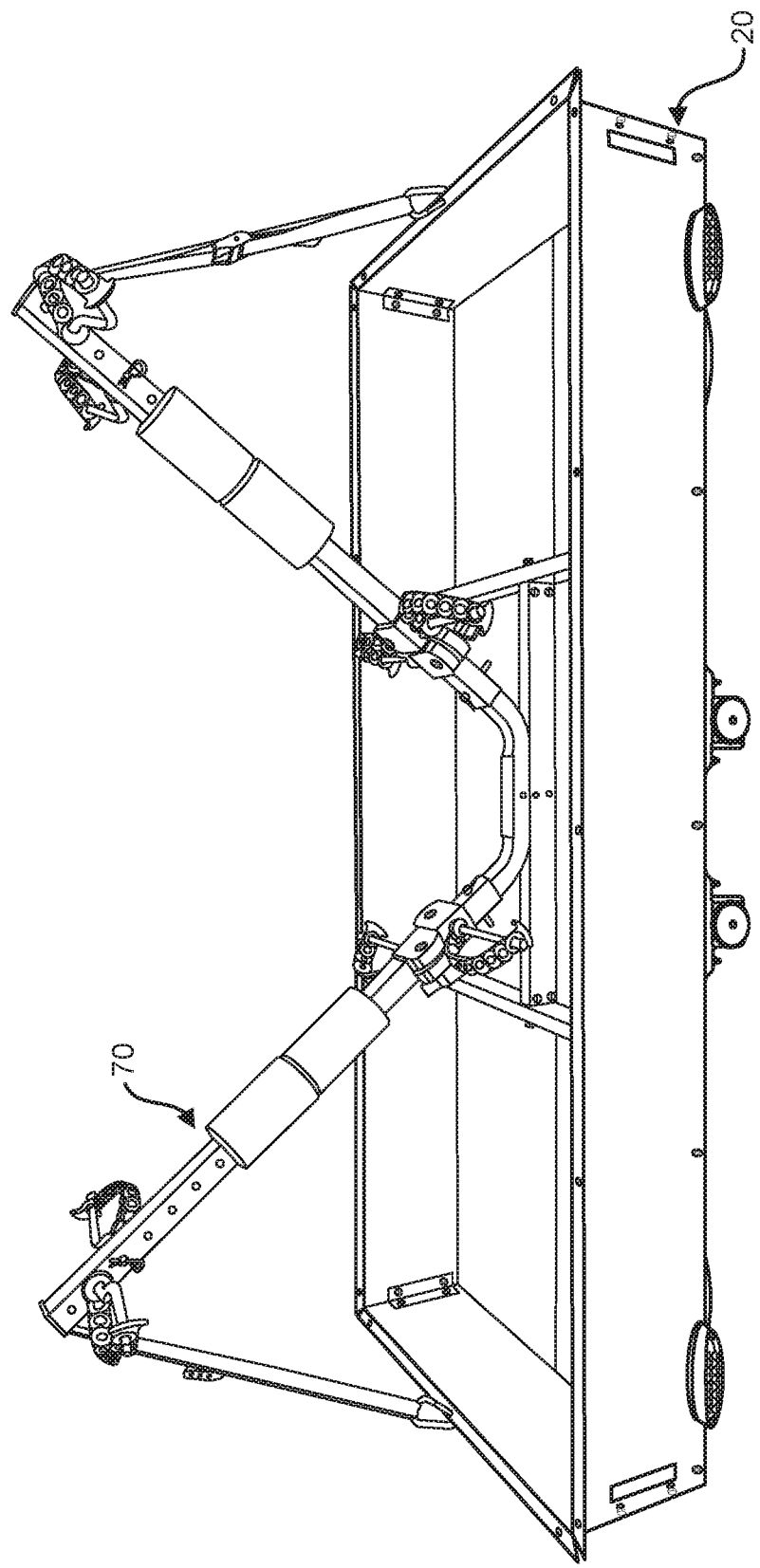
FIG. 13 is a rear view of the cargo carrier of the present invention with a V-shaped bicycle/cargo rack installed in the cargo carrier.
Figure 13A:
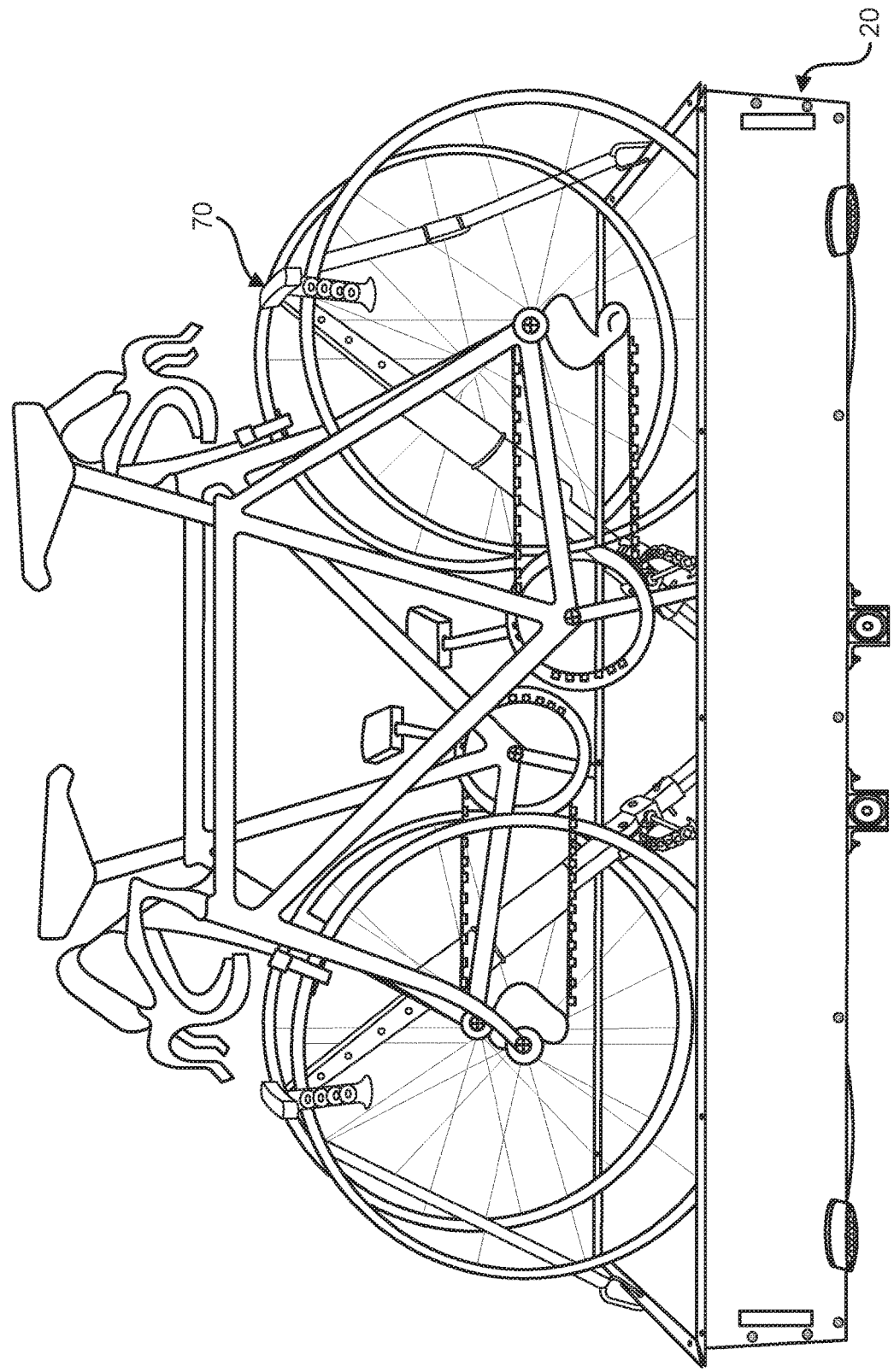
FIG. 13A is a rear view of the cargo carrier of the present invention with a V-shaped bicycle/cargo rack installed in the cargo carrier with two bicycles attached to the rack.

Furthermore, as shown in FIGS. 13 and 13A, other accessories may also be available and configurable with the cargo carrier 10, such as a bike rack or cargo rack. The V-shaped bike/cargo rack as shown is inserted into the center portion of the cargo carrier and is secured to the cargo carrier by the fastening straps to the upper and outer ends of the V and to the outward facing flanged edges of the side members. This simple configuration allows for easy insertion and removal of the bike/cargo rack. The rack, although useable for bicycles where a bicycle is hung by the wheels on the hooks on the V, these hooks can be changed out with different hooks that are capable of carrying surf boards, snow boards, ladders, weed trimmers, rakes, wheel chairs and a large variety of other items. It is also noted that the covering systems available can work in conjunction with the bike/cargo rack so that whatever cargo is hung from, inserted or loaded into the cargo carrier can be protected from the elements and from theft.

A ramp, not shown in the Figures, can also be attached to one of the sides. To facilitate the ramp attachment a side member is removed and replaced with a ramp. This is a simple addition due to the easy cargo carrier assembly. The ramp is added by simply removing the corner braces on the end where the ramp is to be added, the end panel is removed and replaced with the ramp.

While the foregoing written description of the invention enables one of ordinary skill to make and use the present invention, those of ordinary skill will contemplate variations, combinations, and equivalents of the specific embodiment, method, and examples herein. The invention should therefore not be limited by the above described exemplary embodiments, but by all alternatives and permutations which are, therefore, within the scope and spirit of the present invention.

What is claimed:

1. A configurable, easily assembled and disassembled cargo carrier comprising:
   at least one floor member with at least one downward facing flanged edge; at least two side members where each side member has an outward facing flanged top edge and an inward facing flanged bottom edge;
   at least one corner brace to securely connect one of said side members to another of said side members, thereby forming a corner of said cargo carrier;
   fasteners for securing at least said at least one floor member to said at least two side members and said corner braces to said at least two side members; and
   a chassis attachment system for securing assembled cargo carrier to a chassis where said chassis attachment system is a side member mounting system that is attachable and removable from at least one side of said cargo carrier and from said chassis.

2. The configurable cargo carrier of claim 1 where said side member mounting system further comprises:

at least one side member that is approximately the length of said cargo carrier side where:

an upper portion of said side member is a receiver channel;

at least two holes formed in opposing sides of said receiver channel; and at least one fastener for insertion through at least two holes.

3. The side member mounting system of claim 2 further comprising:

at least one tilt bracket secured to said chassis;

at least one tilt tube;

said tilt tube is tiltably affixable to said tilt bracket;

an inner side of said receiver channel matingly fits over said tilt tube; and where said at least one fastener is inserted through said holes on either side of said receiver channel to secure said side member to said tilt tube.

4. The side member mounting system of claim 3 where said fasteners compress opposite sides of said receiver channel about said tilt tube so that when loose said side member is adjustable on said tilt tube but when tightened said side member is securely affixed to said tilt tube.

5. The side member mounting system of claim 4 having two receiver channel side members configured to be on opposite sides of said cargo carrier.

6. A configurable, easily assembled and disassembled cargo carrier comprising:

at least one floor member having a perpendicular downward facing flange along a periphery where said downward facing flange with spaced apart floor member receiver holes;

four side members configured for aligned attachment along the periphery of the floor member, wherein each side member has a perpendicular outward facing flanged top edge, and a bottom flanged edge with receiver holes in spaced apart correspondence with said floor member receiver holes for fastening said side members to said floor member to form an open enclosure, and wherein said side members have corresponding side edges with side edge receiver holes;

a receiver channel provided along a length of opposing outward facing surfaces on at least two of said side members;

four corner braces having brace receiver holes in spaced apart correspondence to said side edge receiver holes to secure corresponding side edges of the side members in abutted perpendicular alignment;

fasteners for securing through tightened engagement with corresponding floor member receiver holes of said mounting portion to said bottom edge receiver holes of said side members and for securing said corner brace receiver holes to said side edge receiver holes of said side members to form an open enclosure.

7. The cargo carrier of claim 6 further having two chassis attachment rails configured in parallel orientation for securable attachment to said receiver channel of the side walls to thereby attach said cargo carrier to a chassis.

8. The cargo carrier of claim 6, further comprising a removable cover detachably securable about the side members of the cargo carrier.

9. The cargo carrier of claim 6, further comprising a removable container detachably securable within the side members of the cargo carrier.

* * * * *